US008713770B2

(12) United States Patent
Prymak

(10) Patent No.: US 8,713,770 B2
(45) Date of Patent: May 6, 2014

(54) CAPACITOR COMPRISING FLEX CRACK MITIGATION VOIDS

(75) Inventor: John D. Prymak, Greer, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 220 days.

(21) Appl. No.: 13/171,564

(22) Filed: Jun. 29, 2011

(65) Prior Publication Data

US 2011/0252614 A1   Oct. 20, 2011

Related U.S. Application Data

(62) Division of application No. 12/253,598, filed on Oct. 17, 2008, now Pat. No. 8,576,537.

(51) Int. Cl.
*H01G 7/00* (2006.01)
*H01G 4/06* (2006.01)
*H01G 4/30* (2006.01)
*H01G 4/20* (2006.01)

(52) U.S. Cl.
USPC ............ 29/25.41; 361/321.2; 361/321.3; 361/321.4; 361/321.5; 361/301.4; 361/311; 361/313

(58) Field of Classification Search
USPC ........ 29/25.41; 361/303, 321.3, 321.4, 308.1, 361/309, 321.5, 311, 321.2, 313
See application file for complete search history.

(56) References Cited

U.S. PATENT DOCUMENTS

| 5,229,642 A | 7/1993 | Hara et al. |
| 5,466,887 A | 11/1995 | Hasegawa et al. |
| 6,025,639 A | 2/2000 | Mitwalsky et al. |
| 6,191,933 B1 | 2/2001 | Ishigaki et al. |
| 6,495,918 B1 | 12/2002 | Brintzinger |
| 7,667,949 B2 | 2/2010 | Maxwell |

FOREIGN PATENT DOCUMENTS

| JP | 07037747 A | 2/1995 |
| JP | 2005347496 | 12/2005 |

*Primary Examiner* — Eric Thomas
*Assistant Examiner* — Arun Ramaswamy
(74) *Attorney, Agent, or Firm* — Joseph T. Guy; Perkins Law Firm, LLC

(57) ABSTRACT

A ceramic multilayer surface-mount capacitor with inherent crack mitigation void patterning to channel flex cracks into a safe zone, thereby negating any electrical failures.

13 Claims, 8 Drawing Sheets

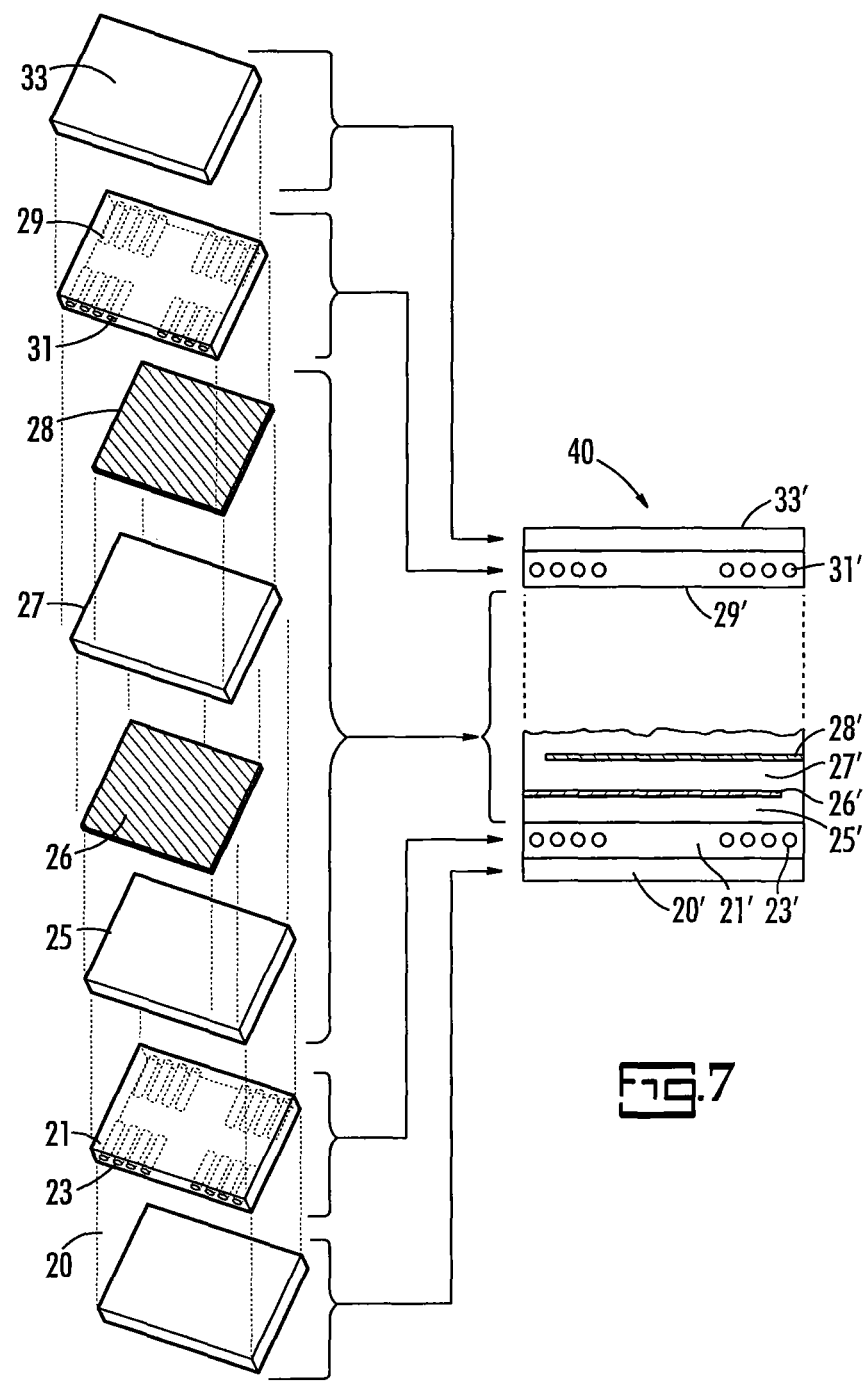

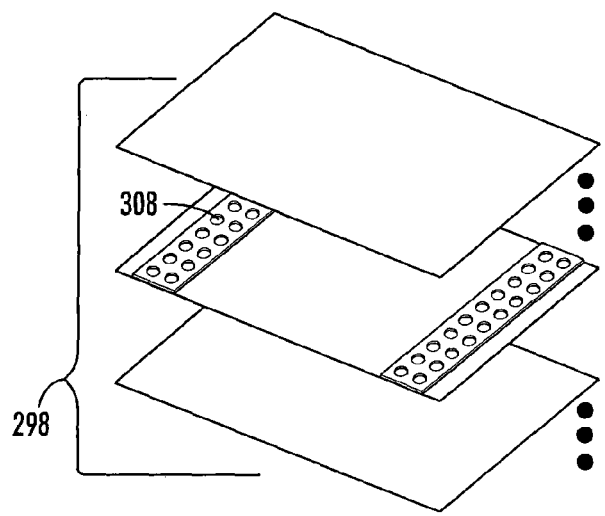
FIG. 8A
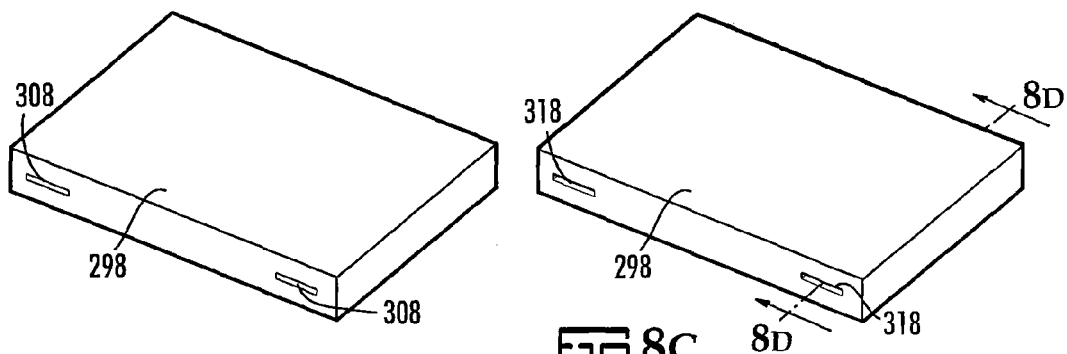
FIG. 8B
FIG. 8C
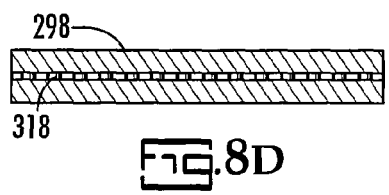
FIG. 8D

US 8,713,770 B2

CAPACITOR COMPRISING FLEX CRACK MITIGATION VOIDS

This application is a divisional application of U.S. patenet application Ser. No. 12/253,598 filed Oct. 17, 2008, now U.S. Pat. No. 8,576,537.

BACKGROUND OF THE INVENTION

The present invention is directed to an improved capacitor. More specifically, the present invention is directed to a capacitor comprising channels for directing flex cracks in a benign direction wherein the function of the capacitor is not hindered.

Capacitors are well known in the art of electrical components. Capacitors typically comprise parallel plates with a dielectric there between. The parallel plates act as charge collectors and sources. The function of capacitors is well known and further discussion is not warranted herein.

Capacitors are passive elements that are added to circuitry with the primary function of being a source of energy for circuit functionality. Capacitors are primarily mounted onto circuit traces as a reserve of energy, and in themselves do not typically contribute to the circuit charge or discharge path.

Multilayer ceramic capacitors (MLCC) are used in a variety of electrical applications including automotive products, aerospace products, heavy equipment and military applications, as examples. Typical applications include telemetrics, entertainment systems, drive control systems, environmental control systems, console instrumentation, communication systems, weapons fire control systems, detection systems and the like. Many applications involve particularly harsh environments including extreme temperature and humidity excursions, vibrations, jolting, and other potentially harmful activities. All of these conditions can lead to substrate flexing which places considerable stress on the capacitor. The stresses due to flexing typically lead to failures in the insulation and are referred to as insulation failure (IR) losses.

Flex cracks, which are a common problem in MLCC's, often lead to a loss of both capacitance and IR. Decreases in IR is considered to be the most severe issue with regards to the percentage of diagnosed capacitor failures, severe cases lead to "short-circuit" and circuit failure. They can occur in many areas of the lifecycle including manufacturing, device assembly, module assembly and during the ultimate application or use. Flex cracks lead to a myriad of problems from manufacturing losses to complete device malfunction with many failure modes there between. As there is no method for 100% electrical or visual testing of this fault, most problematic is the flex crack whose failure is delayed to the point where field failures occur.

Various designs have been described to avoid flex cracks. These include open-mode, floating electrode and flexible termination capacitors. The open-mode designs use wide end margins to prevent the crack from propagating into the active area. Floating electrode capacitors use coplanar non-contacting electrode plates with non-terminated plates interleaved between the planes. Flexible terminations create an elastic connection to the substrate, or printed circuit board, so that small displacements at the termination point on the substrate can be withstood without cracks occurring in the capacitor.

Eliminating flex cracks has proven to be a very difficult task using the techniques currently employed in the art. Furthermore, the methods described are design specific therefore requiring a different method of crack failure mitigation with each new capacitor design. The present invention provides a method of mitigating the impact of flex cracks which is not design specific.

SUMMARY OF THE INVENTION

It is an object of the present invention to provide an improved capacitor wherein failures resulting from stress cracks are mitigated.

It is another object of the present invention to provide a capacitor which channels stress cracks to a location wherein minimal damage to the conductive electrodes occurs.

A particular feature of the present invention is the ability to manufacture the capacitor in conventional manufacturing equipment with minimal changes to manufacturing equipment, chemical compositions used or process.

These and other advantages, as will be realized, are provided in a capacitor with parallel plates of opposing polarity and a dielectric there between and with at least one crack mitigation void between a lower face of the capacitor and a first plate of the parallel plates.

Yet another embodiment of the invention is provided in a method of forming a capacitor comprising:
forming a channel layer wherein the channel layer comprises at least one pre-channel in a predetermined pattern;
forming a first conductor over the channel layer;
forming a dielectric on the first electrode;
forming a second conductor on the dielectric; and
removing the pre-channel thereby forming a crack mitigation void in the predetermined pattern.

BRIEF DESCRIPTION OF FIGURES

FIG. 7 is an exploded perspective and cross-sectional schematic views of embodiments of the present invention.

FIGS. 8A-8D further illustrate the formation of the channel layer of FIG. 8.

DETAILED DESCRIPTION OF THE INVENTION

The invention will be described with reference to the drawings forming an integral part of the disclosure. In the various figures similar elements will be numbered accordingly.

Figure 1:
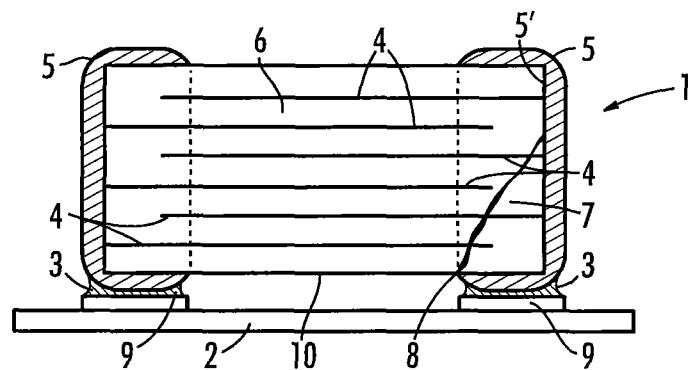
FIG. 1 is a cross-sectional schematic view of a capacitor with a stress crack therein.

A capacitor is illustrated in schematic cross-sectional view in FIG. 1. The capacitor, generally represented at 1, is attached to a substrate, 2, such as by solder, 3, at circuit traces, 9. The capacitor comprises parallel plates, 4, alternately in contact with the external terminations, 5, of opposing polarity covering the termination face, 5', with overlaps along the top and bottom face, 10 of the capacitor. A dielectric, 6, is between the plates. Flexing of the substrate places compressive or strain forces on the capacitor. Compressive forces are not crucial but once the strain reaches a critical level a stress crack, 7, is created. As illustrated in FIG. 1 the stress crack is generally directed away from the substrate at an acute or right angle, initiating at the terminal edge, 8, along the bottom face, 10, of the external termination, and rising up into the body of the capacitor and terminating at the termination face, 5', or top face of the capacitor. The crack may also project upward at a right angle into the top face of the capacitor, or start out at an acute angle and then curve upward into the top face. While not readily visible from this view the stress crack is typically completely through the capacitor, into and out of the plane of the view, and causes a fracture of at least some of the plates, possibly decreasing the capacitance. As would be readily realized a typical capacitor may have hundreds of plates and the number of plates subject to shearing is very large relative to the schematic views illustrated herein. Critical in this crack creation is that it creates the foundation for a conductive path, through the insulating ceramic across oppositely terminated electrode plates. Upon initial creation, there is normally no entrapment of conductive material and the device may appear with "normal" leakage resistance and capacitance. With moisture ingress into the crack over time, the moisture may carry conductive ions, and over time, a conductive path is formed. The conductivity of this path can increase over time, and fault current here may reach levels to degrade the component to catastrophic failure.

Figure 2:
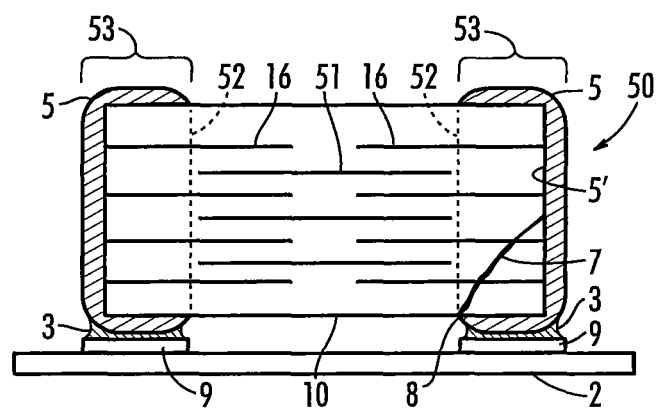
FIG. 2 is a cross-sectional schematic view of a floating plate electrode with fail-open end margins.

FIG. 2 illustrates prior art in cross-sectional schematic view in which extended end margins and a floating electrode design are incorporated to establish a fail-safe design. This drawing represents the embodiment of two methods practiced today to mitigate the leakage failures in ceramic capacitors: extending the end-margins free of opposing electrodes, 53, and creating two capacitors in series. The end margin of the termination overlap creates boundaries, 52, where a crack initiated at the edge, 8, at an acute angle direction now extends into a region, 53, where the only electrodes it crosses are of the same polarity. If the crack became conductive, it would not draw any leakage current as the electrodes are of the same termination. The floating electrode capacitor, 50, has adjacent non-connecting conductive plates, 16, and floating plates, 51, whereby they end before the outside termination wraps, 52, and outside the safe region, 53. Non-connecting conductive plates are preferably parallel and in common planes across the capacitor with coplanar plates being of opposing polarity. The current path is from non-connecting terminating plates on one side to the floating plates then to the non-connecting terminating plates on the opposing side, effectively creating two capacitors in series. This represents the ultimate in present mitigation techniques in case the ends of the floating electrode extend into the safe region, a near right angle crack could involve electrodes of opposite polarity but it would involve only one of the two capacitors in series. The chances that the floating electrode could violate safe regions, 53, at both ends, and have both capacitors suffer cracks simultaneously is small. Both ends would have to fail simultaneously because if one end fails first, there is no mechanical anchor at that end to develop strain on the other end. Alternative offerings include using the floating electrode or cascade design alone, or using the safe-region created with shorter electrodes. All of these practices improve flex reliability, but all allow the crack to penetrate deep into the body of the capacitor.

Figure 3:
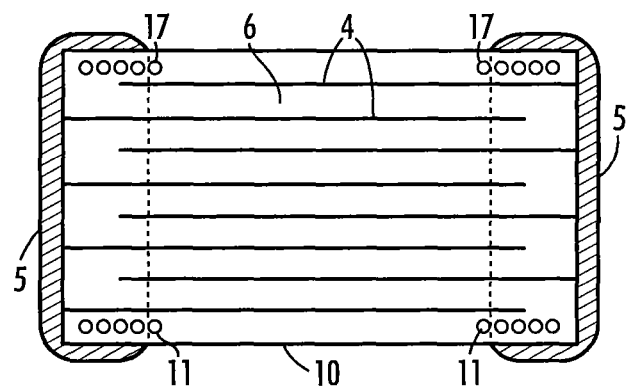
FIG. 3 is a cross-sectional schematic view of an embodiment of the present invention.

An embodiment of the present invention is illustrated in schematic cross-sectional view in FIG. 3. In FIG. 3 a capacitor comprising alternating plates, 4, external terminations, 5, and dielectric, 6, between and partially encasing the plates is illustrated. A series of crack mitigation voids, 11, between the lower face, 10, and first outermost plate, 4, provides protection from crack propagation. These crack mitigation voids could be cylindrical projections perpendicular to the plane of the view, and in this view would appear as circular shapes as the cylindrical shape is being cut perpendicular to its height.

Figure 4:
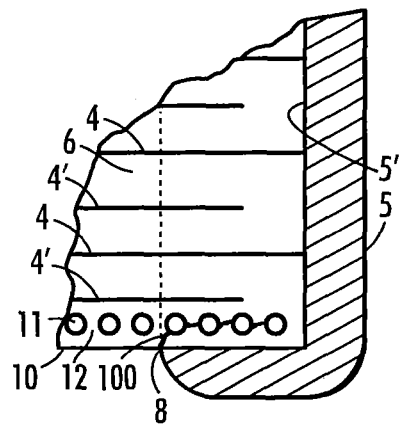
FIG. 4 is a partial cross-sectional schematic view of an embodiment of the present invention wherein the utility is illustrated.

The advantages of the present invention will be described with reference to FIG. 4, wherein a partial cross-sectional area of an inventive capacitor is illustrated. In FIG. 4, a series of crack mitigation voids, 11, are provided which form a line, which is preferably arranged parallel to the plates and perpendicular to the capacitor's termination face, 5'. Cracks, represented at 100, typically form at the junction of the edge of the bottom termination wrap, 8, and extend across a portion, up to the entire width, of the capacitor body. This is not visible in FIG. 4 since the crack would extend at a large angle relative to the page and typically approximately perpendicular to the page. While not limited thereto, the invention will be described based on this most common failure mode with the understanding that crack initiation anywhere along the lower face, 10, will be mitigated by the invention. A crack typically propagates at an acute angle away from the lower face, 10. As realized from the discussion above the crack typically damages plates, 4' and 4. In the present invention the crack mitigation voids, 11, are arranged in a row, preferably parallel to the lower face, such that as the crack propagates it encounters a crack mitigation void. The crack mitigation voids, represented as cylindrical crack mitigation voids without limit thereto, has a general structure of crack mitigation voids, 11, and struts, 12, between the crack mitigation voids. It is preferable that the width of the struts, measured as the closest approach of adjacent crack mitigation voids, be less than the closest distance between the crack mitigation voids and the closest plate. The struts therefore represent the lowest path of resistance for crack propagation thereby persuading the crack to propagate along the line of crack mitigation voids into the termination face, 5', as illustrated, and prohibiting them from approaching the plates, 4' and 4. The crack is therefore channeled to a location which is not harmful to the capacitor while, at the same time, allowing the stress to be relieved.

As illustrated in FIG. 4, crack propagation tends to migrate at an acute angle towards the closest termination face, 5'. In order to capture this crack, the series of crack mitigation voids must extend from the termination face to a point beyond the termination wrap's edge, 8, along the bottom face of the capacitor. The crack mitigation voids may extend the entire length of the capacitor but this is not preferred due to the lack of structural integrity of the capacitor in this instance.

Figure 5:
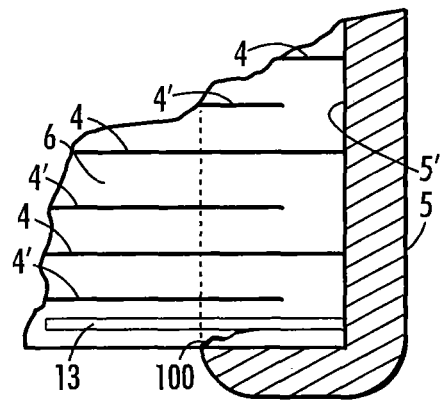
FIG. 5 is a partial cross-sectional schematic view of another embodiment of the present invention wherein the utility is illustrated.

Another embodiment of the invention is illustrated in FIG. 5. In FIG. 5 an open channel, 13, is provided wherein a crack, 100, which propagates to the channel will be mitigated from proceeding beyond the channel. This rectangular shape could be created by a series of parallel cylinders of the crack mitigation voids wherein the height of the cylinder is parallel to the plane of the drawing. In the same manner that the crack mitigation voids in FIG. 4 are a manifestation of parallel cylinders with a channel separation, 12, these parallel cylinders would be separated in a like manner, each cylinder at a progressive depth into the capacitor body maintaining a like separation.

Figure 6:
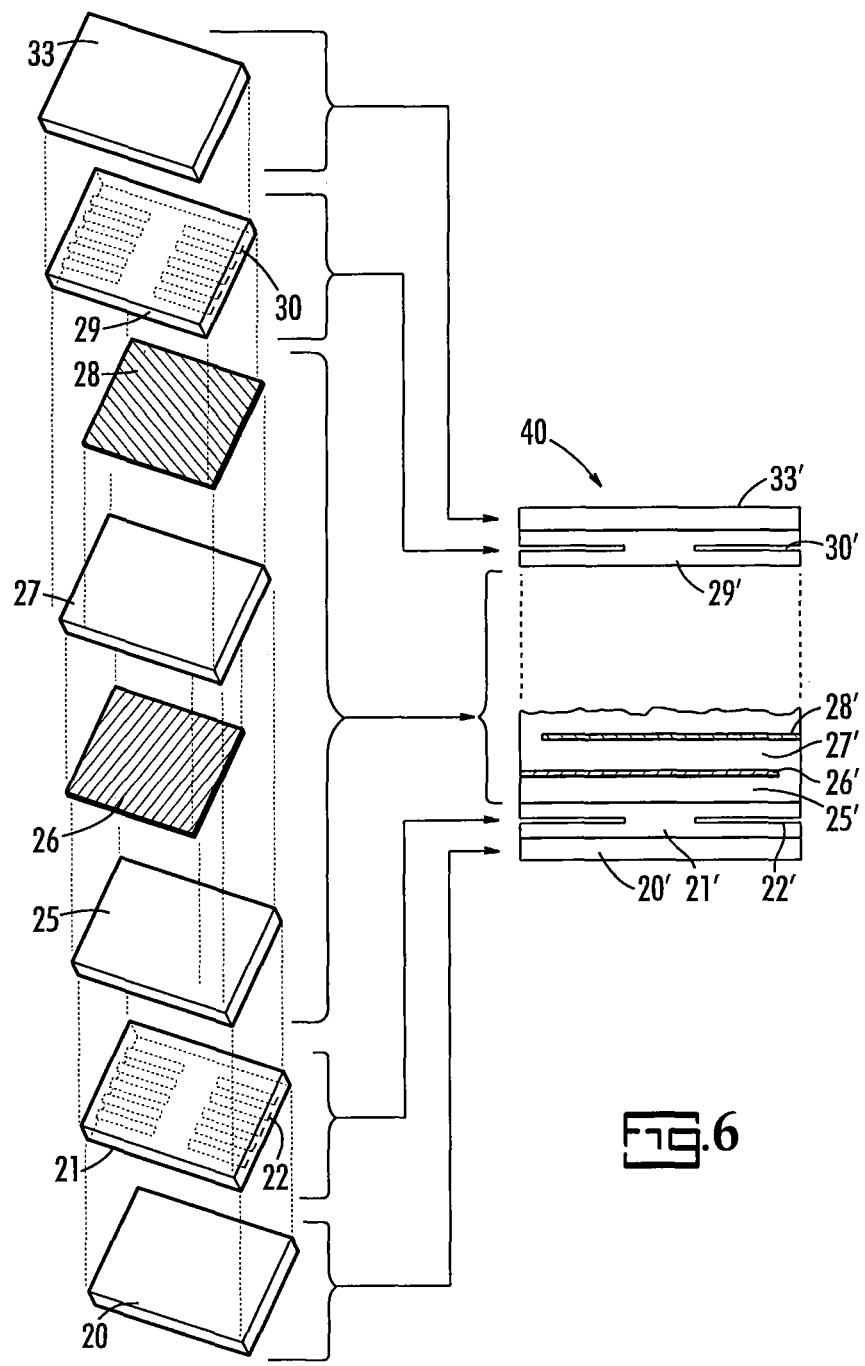
FIGS. 6 is an exploded perspective and cross-sectional schematic views of embodiments of the present invention.
Figure 8:
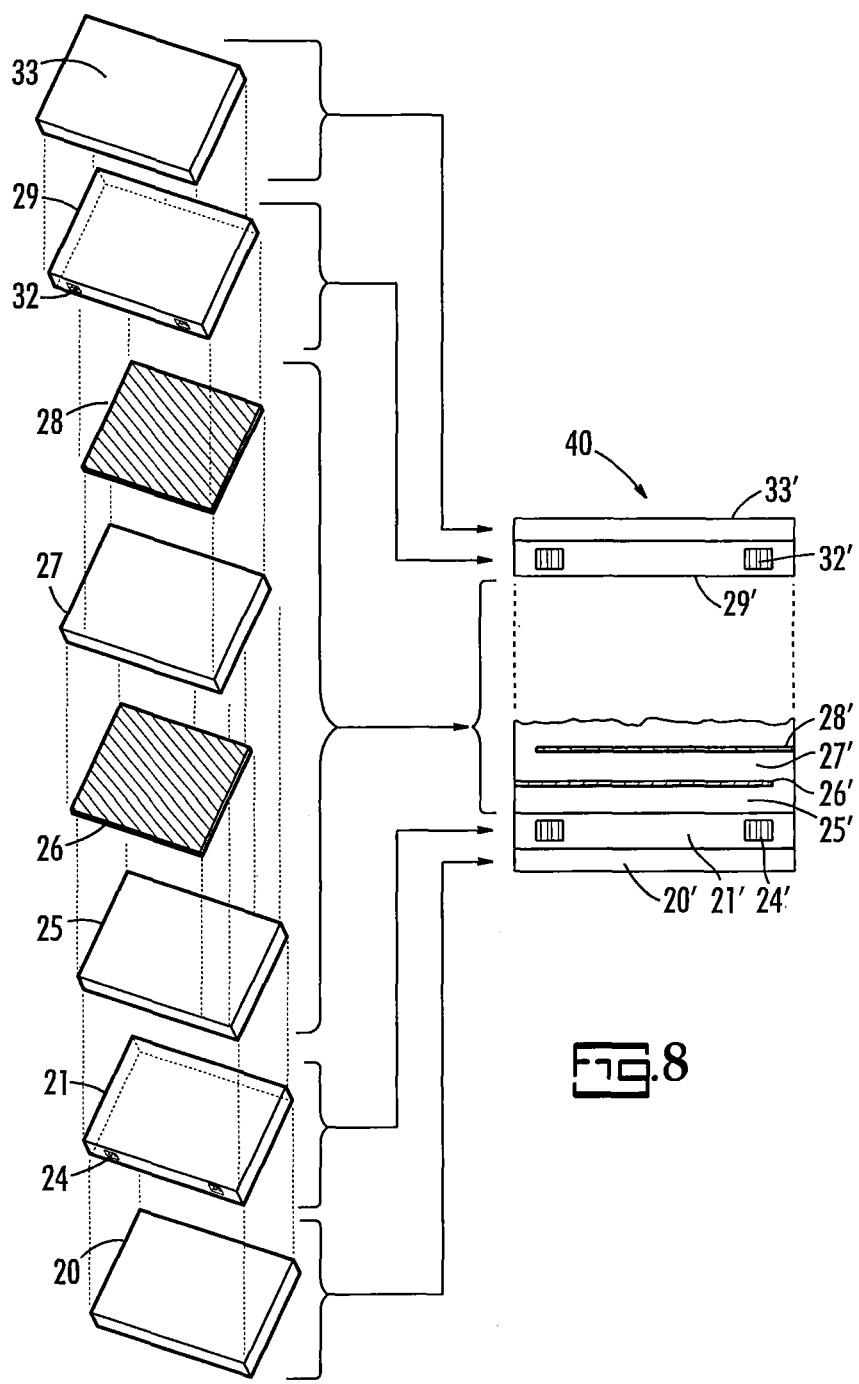
FIG. 8 is an exploded perspective and cross-sectional schematic views of embodiments of the present invention.

A preferred method of manufacturing the capacitor will be described with reference to FIGS. 6-8. In each of FIGS. 6-8 an inventive capacitor, 40, is illustrated schematically after sintering on the right side of the figure and in blown-apart perspective in the left side of the figure prior to sintering for clarity and to facilitate description. For convenience, a sintered layer of ceramic will be indicated by a primed number.

A base layer, 20, which is preferably a ceramic dielectric is provided in accordance with the standard practice for MLCC manufacture in the art. A ceramic dielectric is preferred for manufacturing simplicity since the same material as the dielectric can be used thereby minimizing the number of materials and eliminating differences in the coefficient of thermal expansion. At least one channel layer, 21, is applied to the base layer, 20. It is preferred that multiple channel layers be applied thereby increasing the total thickness. Alternatively, a thick pre-channel layer can be applied, however, the application of multiple layers may be more efficient from a manufacturing perspective. The channel layer comprises pre-channels, 22-24, with a predefined, preferably parallel, configuration. The pre-channels are areas of material which evaporate during the sintering of the channel layer. The pre-channels can be printed by any method, however, for convenience it is preferable that the channel layer be printed in a manner consistent with formation of the electrode. When the channel layer is sintered the material in the pre-channel is volatilized thereby leaving a crack mitigation void. The crack mitigation void is approximately the shape and dimensions of the pre-channel. The shape of the pre-channel is not particularly limited herein. It is preferable that the pre-channel terminate at a face to facilitate the escape of volatilized pre-channel material from the interior of the monolith during sintering. Pre-channels which are parallel to the side of the capacitor, as illustrated at 22, are particularly preferred since they form cylindrical-like crack mitigation voids in the eventual capacitor, corresponding to the crack mitigation void detailed in FIG. 5. Pre-channels which run perpendicular to a side of the capacitor, as illustrated at 23, may be utilized to provide an open channel, and these patterns would create the patterns shown in FIG. 7. Pre-channels arranged in a cross-hatch pattern, as illustrated at 24, may be used to provide a crack mitigation void region with distinct pillars therein. When multiple layers are combined to form a channel layer each layer may be substantially identical to the previous layer such that the overlaid pre-channels coalesce into a continuous channel during sintering. In other embodiments adjacent layers, or groups of adjacent layers, may have a different pattern.

A first polarity layer comprising a dielectric, 25, and first conductive layer, 26, is applied atop the channel layer. The first conductor layer preferably comprises a first conductor which extends to an edge for eventual electrical contact with an external termination. A second polarity layer comprising a dielectric, 27, and second conductive layer, 28 is applied to the first polarity layer such that the first and second conductive layers are separated by a dielectric with termination at differing external terminations. Additional first and second polarity layers are applied with each conductive layer separated from the adjacent conductive layer by a dielectric until the predetermined number of alternating plates is obtained. It is realized in the art that the parallel plates separated by a dielectric provide the function of capacitance. The polarity layers may be added sequentially wherein, for example, a dielectric layer is formed followed by a first conductive layer, followed by a dielectric layer, followed by a second dielectric layer in repeating sequence. Alternatively, the capacitor layer comprising a dielectric and first conductor may be formed and then deposited followed by a dielectric and second conductor being formed and then deposited. Any number of preformed layers may be utilized.

After a sufficient number of plates of alternating polarity are provided an optional, but preferred, second channel layer, 29, is applied. The second channel layer comprises a pre-channel, 30-32, as described above. A top base layer, 33, is preferably added on the channel layer. As it is preferable that the finished capacitor be mounted in a manner where the crack mitigation void elements are along the bottom face of the chip, the top layer of crack mitigation void patterns allows the chip to be mounted top-up or top-down to create the required arrangement. As it is imperative that the crack mitigation voids be along the bottom face of the capacitor, capacitor styles where the width and thickness are indistinguishable would require external marks, such as electrode ink dots, on the top and bottom face of the chip to correctly identify a top or bottom face alignment.

The assembly is heated to form sintered ceramic, 21', 25', 27' and 29' and crack mitigation voids, 22', 23', 24', 30', 31' and 32'.

Figure 6A:
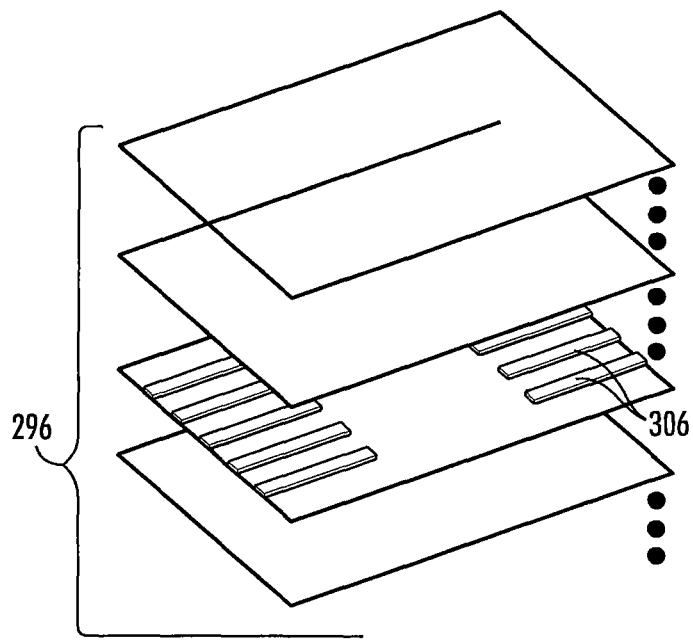
FIGS. 6A-6D further illustrate the formation of the channel layer of FIG. 6.
Figure 6B:
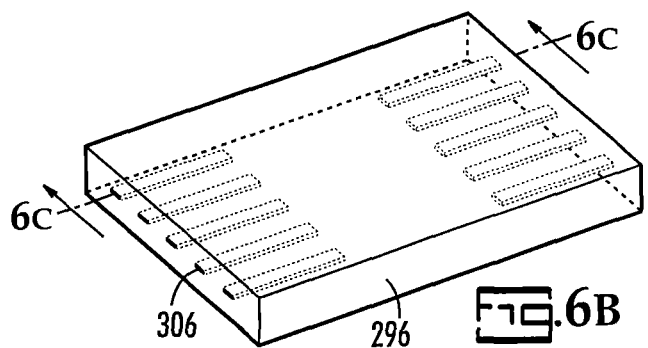
Figure 6C:
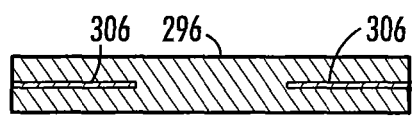
Figure 6D:
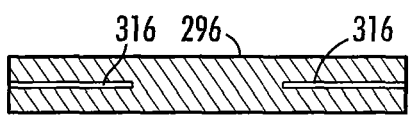
Figure 7A:
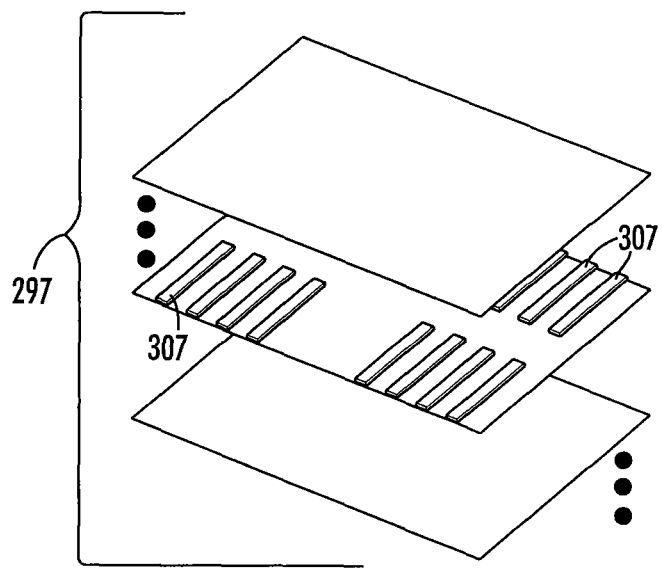
FIGS. 7A-7D further illustrate the formation of the channel layer of FIG. 7.
Figure 7B:
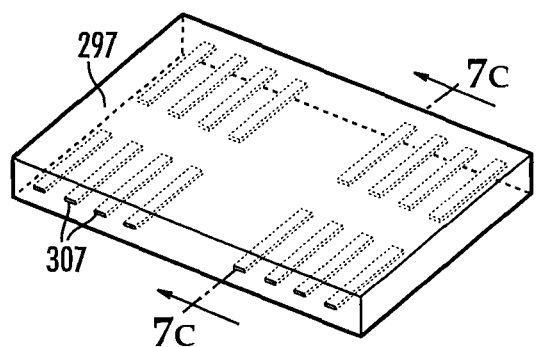
Figure 7C:
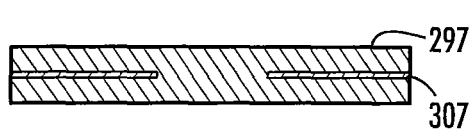
Figure 7D:
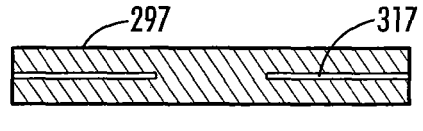

Channel layer formation is more thoroughly described with reference to FIGS. 6a-c, 7a-d and 8a-b. In each illustration the channel layer, 296-298, is formed by building up sequential layers. In each layer a pre-channel material, 306-308, is printed in a pattern which will correspond to the crack mitigation void, 316-318. Upon sintering the pre-channel material vaporizes leaving a void in the shape of the printed channel. As illustrated in FIGS. 6a-c, the pre-channel material, 306, is printed in the form of a rectangle which ultimately forms a rectangular crack mitigation void, 316. In FIGS. 7a-7d the pre-channel material is printed in patterns which are progressively wider towards the middle and than progressively narrower thereby approximating a somewhat cylindrical bore as the crack mitigation void 317. In FIGS. 8a-b a honeycomb pattern is printed thereby yielding a crack mitigation void, 318, with pillars therein. It is preferable that the void comprise open areas with no pre-channel material totally enclosed thereby facilitating vaporization of the pre-channel material during sintering.

The pre-channel material is any material which can be applied in a predetermined pattern and, upon sintering of the layer, leaves a crack mitigation void. A particularly preferred material is an electrode ink with the metal excluded there from. Such materials are preferred due to their ready availability and their inherent suitability with the manufacturing environment.

It is most preferable that the capacitor have a rectangular configuration, most preferably, with the thickness being less than the width. The width is determined parallel to the plates and the thickness is determined perpendicular to the plates. If a square configuration is used it is difficult to insure that the plates are perpendicular to the substrate unless a physical element is included in the shape to indicate orientation. Pick and place devices can not easily distinguish orientation for a square, or symmetrical, part easily and elements such as visual recognition, to indicate orientation are cost prohibitive. Therefore, it is most preferable to avoid square capacitors due to the inability to easily predict the orientation of the plates in a manufacturing environment. In a particularly preferred embodiment the width is at least about 10% greater than the thickness. This allows for the correct orientation of capacitors with the electrode plates in a vertical orientation. As flex cracks are more abundant in larger ceramic chip capacitors, this method would not typically be necessary from chips sizes of 0603 (6 mm×3 mm) and smaller.

The capacitor is preferably designed to accommodate pick and place equipment. Typically, parts are placed on a printed circuit board using automated pick and place equipment that removes parts from a tape. The tape has slots in which the capacitors reside and the tape is typically on a reel. The parts must be properly oriented within the slots of the tape to insure vertical orientation. Most reelers utilize precision slots and vibration to align and load parts into the pockets of the tape packaging. To insure adequate placement within the indention it is preferable for the parts to have a width to thickness ratio greater than 1.1 to 1.0 for the parts to always fall properly into the slots. Decreasing the center of gravity of the parts drives them to orient with the wide side down.

The dielectric layers have an appropriate Curie temperature which is determined in accordance with the applicable standards by suitably selecting a particular composition of dielectric material. Typically the Curie temperature is higher than 45° C., especially about 65° C. to 125° C.

Each dielectric layer preferably has a thickness of up to about 50 μm, more preferably up to about 20 μm. The lower limit of thickness is about 0.5 μm, preferably about 2 μm. The present invention is effectively applicable to multilayer ceramic chip capacitors having such thin dielectric layers for minimizing a change of their capacitance with time. The number of dielectric layers stacked is generally from 2 to about 300, preferably from 2 to about 200.

The conductor which forms the internal electrode layers is not critical, although a base metal preferably is used since the dielectric material of the dielectric layers has anti-reducing properties. Typical base metals are nickel and nickel alloys. Preferred nickel alloys are alloys of nickel with at least one member selected from Mn, Cr, Co, and Al, with such nickel alloys containing at least 95 wt % of nickel being more preferred. It is to be noted that nickel and nickel alloys may contain up to about 0.1 wt % of phosphorous and other trace components.

The thickness of the internal electrode layers may be suitably determined in accordance with a particular purpose and application although its upper limit is typically about 5 μm, more preferably about 2.5 μm, and its lower limit is typically about 0.5 μm. Most preferable is a thickness of about 1 μm.

The conductor which forms the external electrodes is not critical, although inexpensive metals such as nickel, copper, and alloys thereof are preferred. The thickness of the external electrodes may be suitably determined in accordance with a particular purpose and application although it generally ranges from about 10 μm to about 50 μm. In one embodiment a conductive metal, preferably silver, filled epoxy termination is utilized as a termination.

The multilayer ceramic chip capacitor of the present invention generally is fabricated by forming a green chip by conventional printing and sheeting methods using pastes, firing the chip, and printing or transferring external electrodes thereto followed by baking.

Paste for forming the dielectric layers can be obtained by mixing a raw dielectric material with an organic vehicle. The raw dielectric material may be a mixture of oxides and composite oxides as previously mentioned. Also useful are various compounds which convert to such oxides and composite oxides upon firing. These include, for example, carbonates, oxalates, nitrates, hydroxides, and organometallic compounds. The dielectric material is obtained by selecting appropriate species from these oxides and compounds and mixing them. The proportion of such compounds in the raw dielectric material is determined such that after firing, the specific dielectric layer composition may be met. The raw dielectric material is generally used in powder form having a mean particle size of about 0.1 to about 3 μm, preferably about 1 μm.

The organic vehicle is a binder in an organic solvent. The binder used herein is not critical and may be suitably selected from conventional binders such as ethyl cellulose. Also the organic solvent used herein is not critical and may be suitably selected from conventional organic solvents such as terpineol, butylcarbinol, acetone, and toluene in accordance with a particular application method such as a printing or sheeting method.

Paste for forming internal electrode layers is obtained by mixing an electro-conductive material with an organic vehicle. The conductive material used herein includes conductors such as conductive metals and alloys as mentioned above and various compounds which convert into such conductors upon firing, for example, oxides, organometallic compounds and resinates. The organic vehicle is as mentioned above.

Paste for forming external electrodes is prepared by the same method as the internal electrodes layer-forming paste.

No particular limit is imposed on the organic vehicle content of the respective pastes mentioned above. Often the paste contains about 1 to 5 wt % of the binder and about 10 to 50 wt % of the organic solvent. If desired, the respective pastes may contain any other additives such as dispersants, plasticizers, dielectric compounds, and insulating compounds. The total content of these additives is preferably up to about 10 wt %.

A green chip then may be prepared from the dielectric layer-forming paste and the internal electrode layer-forming paste. In the case of printing method, a green chip is prepared by alternately printing the pastes onto a substrate of polyethylene terephthalate (PET), for example, in laminar form, cutting the laminar stack to a predetermined shape and separating it from the substrate.

Also useful is a sheeting method wherein a green chip is prepared by forming green sheets from the dielectric layer-forming paste, printing the internal electrode layer-forming paste on the respective green sheets, and stacking the printed green sheets. A capacitor with a large number of layers can be prepared in this manner as well known in the art.

The method of forming the capacitor is not particularly limiting herein.

The binder is then removed from the green chip and fired. Binder removal may be carried out under conventional conditions, preferably under the following conditions where the internal electrode layers are formed of a base metal conductor such as nickel and nickel alloys.

For binder removal the heating rate is preferably about 5 to 300° C./hour, more preferably 10 to 100° C./hour. The holding temperature is preferably about 200 to 400° C., more preferably 250 to 300° C. and the holding time is preferably about ½ to 24 hours, more preferably 5 to 20 hours in air. The green chip is fired in an atmosphere which may be determined in accordance with the type of conductor in the internal electrode layer-forming paste. Where the internal electrode layers are formed of a base metal conductor such as nickel and nickel alloys, the firing atmosphere may have an oxygen partial pressure of $10^{-8}$ to $10^{-12}$ atm. Extremely low oxygen partial pressure should be avoided, since at such low pressures the conductor can be abnormally sintered and may become disconnected from the dielectric layers. At oxygen partial pressures above the range, the internal electrode layers are likely to be oxidized.

For firing, the chip preferably is held at a temperature of 1,100° C. to 1,400° C., more preferably 1,250 to 1,400° C. Lower holding temperatures below the range would provide insufficient densification whereas higher holding temperatures above the range can lead to poor DC bias performance. The heating rate is preferably 50 to 500° C./hour, more preferably 200 to 300° C./hour with a holding time of ½ to 8 hours, more preferably 1 to 3 hours. The cooling rate is preferably 50 to 500° C./hour, more preferably 200 to 300° C./hour. The firing atmosphere preferably is a reducing atmosphere. An exemplary atmospheric gas is a humidified mixture of $N_2$ and $H_2$ gases.

Firing of the capacitor chip in a reducing atmosphere preferably is followed by annealing. Annealing is effective for re-oxidizing the dielectric layers, thereby optimizing the resistance of the ceramic to dielectric breakdown. The annealing atmosphere may have an oxygen partial pressure of at least $10^{-6}$ atm., preferably $10^{-5}$ to $10^{-4}$ atm. The dielectric layers are not sufficiently re-oxidized at a low oxygen partial pressures below the range, whereas the internal electrode layers are likely to be oxidized at oxygen partial pressures above this range.

For annealing, the chip preferably is held at a temperature of lower than 1,100° C., more preferably 500° C. to 1,000° C. Lower holding temperatures below the range would oxidize the dielectric layers to a lesser extent, thereby leading to a shorter life. Higher holding temperatures above the range can cause the internal electrode layers to be oxidized (leading to a reduced capacitance) and to react with the dielectric material (leading to a shorter life). Annealing can be accomplished simply by heating and cooling. In this case, the holding temperature is equal to the highest temperature on heating and the holding time is zero. Remaining conditions for annealing preferably are as follows.

The binder removal, firing, and annealing may be carried out either continuously or separately. If done continuously, the process includes the steps of binder removal, changing only the atmosphere without cooling, raising the temperature to the firing temperature, holding the chip at that temperature for firing, lowering the temperature to the annealing temperature, changing the atmosphere at that temperature, and annealing.

If done separately, after binder removal and cooling down, the temperature of the chip is raised to the binder-removing temperature in dry or humid nitrogen gas. The atmosphere then is changed to a reducing one, and the temperature is further raised for firing. Thereafter, the temperature is lowered to the annealing temperature and the atmosphere is again changed to dry or humid nitrogen gas, and cooling is continued. Alternatively, once cooled down, the temperature may be raised to the annealing temperature in a nitrogen gas atmosphere. The entire annealing step may be done in a humid nitrogen gas atmosphere.

The resulting chip may be polished at end faces by barrel tumbling and sand blasting, for example, before the external electrode-forming paste is printed or transferred and baked to form external electrodes. Firing of the external electrode-forming paste ma$_y$ be carried out in a humid mixture of nitrogen and hydrogen gases at about 600 to 800° C., and about 10 minutes to about 1 hour.

Pads are preferably formed on the external electrodes by plating or other methods known in the art.

The external terminations are preferably formed by dipping with other methods, such as ink-jet spraying being suitable.

The multilayer ceramic chip capacitors of the invention can be mounted on printed circuit boards, for example, by soldering.

The present invention has been described with particular reference to the preferred embodiments without limit thereto. One of skill in the art would realize additional, and alternative, embodiments which are not specifically stated herein but which are within the scope of the invention more specifically set forth in the claims appended hereto.

The invention claimed is:

1. A method of forming a capacitor comprising:
   forming a channel layer wherein said channel layer comprises at least one pre-channel in a predetermined pattern;
   forming a first conductor over said channel layer;
   forming a dielectric on said first electrode;
   forming a second conductor on said dielectric; and
   removing said pre-channel thereby forming a crack mitigation void in said predetermined pattern wherein said removing said pre-channel is by heating.

2. The method of forming a capacitor of claim 1 wherein said first conductor and said second conductor are coplanar.

3. The method of forming a capacitor of claim 2 further comprising a conductor between adjacent sets of coplanar said first conductor and said second conductor.

4. The method of forming a capacitor of claim 1 further comprising forming a dielectric layer between said channel layer and said first conductor.

5. The method of forming a capacitor of claim 1 further comprising forming a first external termination in electrical contact with said first conductor and forming a second external termination in electrical contact with said second conductor.

6. The method of forming a capacitor of claim 1 wherein said crack mitigation void is elongated.

7. The method of forming a capacitor of claim 6 wherein said crack mitigation void is disposed parallel to said conductors.

8. The method of forming a capacitor of claim 6 comprising pillars in said crack mitigation void.

9. The method of forming a capacitor of claim 1 comprising a multiplicity of crack mitigation voids wherein the closest approach of adjacent crack mitigation voids is a smaller distance than a closest approach between a crack mitigation void and a closest conductor of said parallel conductors.

10. The method of forming a capacitor of claim 1 wherein said crack mitigation void extends over a portion of a width of said capacitor.

11. The method of forming a capacitor of claim 1 comprising a multiplicity of crack mitigation voids.

12. The method of forming a capacitor of claim 11 wherein said crack mitigation voids comprise struts there between.

13. The method of forming a capacitor of claim 12 wherein said struts have a thickness which is less than a distance between said crack mitigation void and a closest plate of said parallel plates.

* * * * *